Aug. 5, 1947.  A. E. BEARSE  2,425,226
PROCESS OF OBTAINING THIODIGLYCOLIC ACID
Filed March 17, 1947
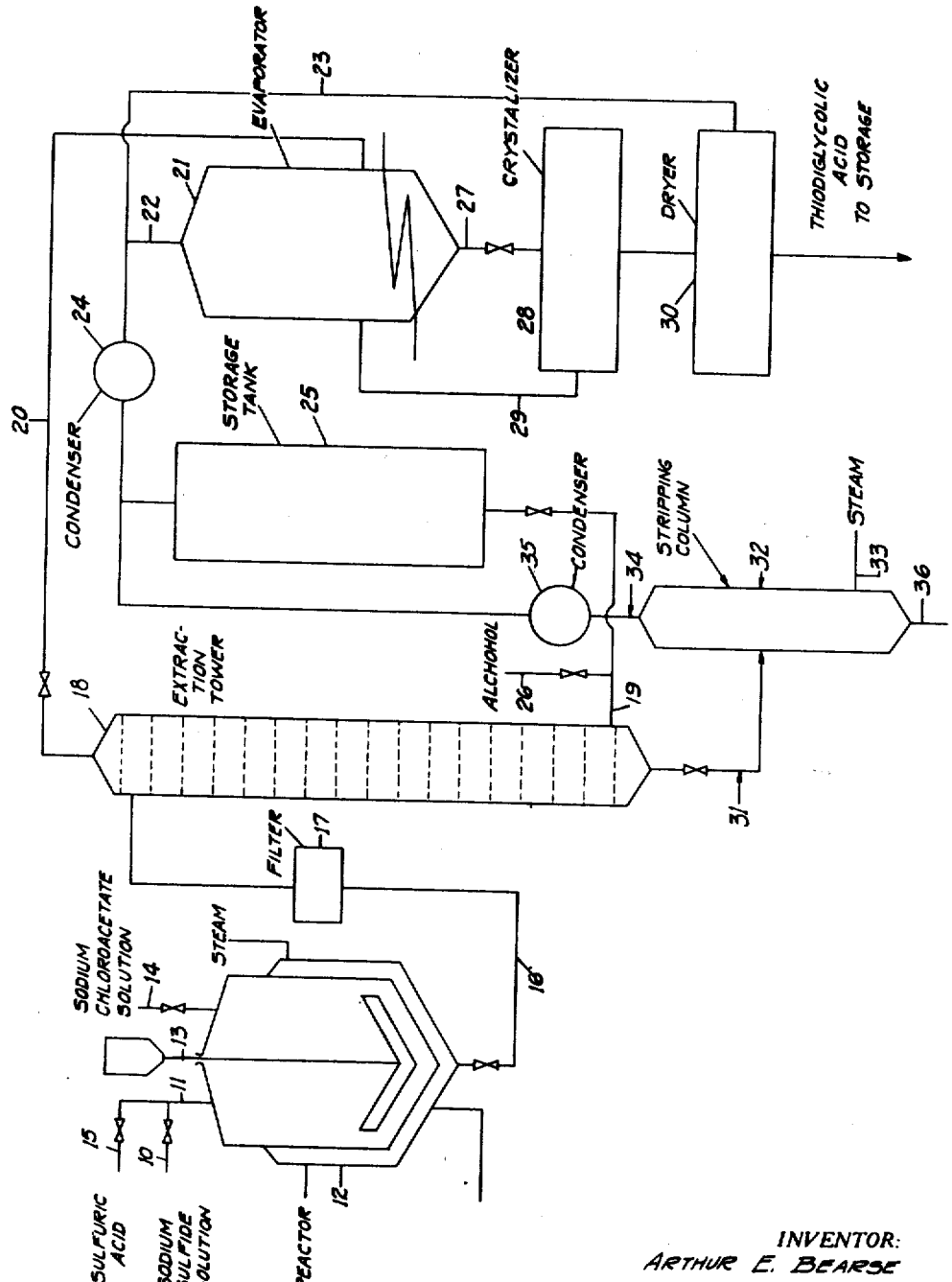
INVENTOR:
ARTHUR E. BEARSE
BY
ATTORNEY

UNITED STATES PATENT OFFICE 2,425,226

PROCESS OF OBTAINING THIODIGLYCOLIC ACID

Arthur E. Bearse, Columbus, Ohio, assignor, by mesne assignments, to The C. P. Hall Company, Akron, Ohio, a corporation of Ohio Application March 17, 1947, Serial No. 735,107

7 Claims. (Cl. 260—526)

This invention relates to an improved method of obtaining thiodiglycolic acid and water-soluble alkyl-substituted thiodiglycolic acids. In particular, it relates to a process for recovering the above acids from aqueous inorganic salt solutions resulting from their production.

Thiodiglycolic acid and its alkyl-substitution products have been prepared ordinarily by the reaction of a salt of an alpha-halogenated fatty acid with an alkali metal sulfide in aqueous solution, followed by acidification with a mineral acid, such as sulfuric or hydrochloric, to liberate the thiodiglycolic acid. The following equations illustrate the reaction:

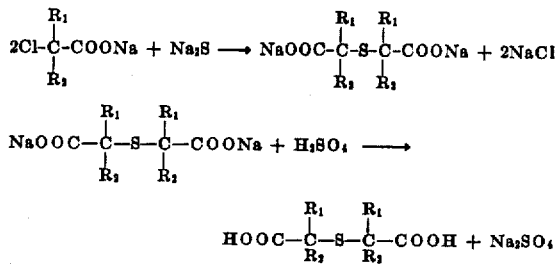

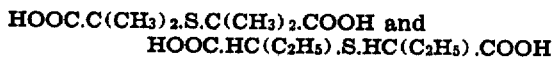

$R_1$ and $R_2$ in the above formulae represent hydrogen atoms or lower alkyl groups which form water-soluble acids, and ordinarily alkyl groups which contain no more than about three carbon atoms. Such acids include, for example, the following:

$HOOC.C(CH_3)_2.S.C(CH_3)_2.COOH$ and
$HOOC.HC(C_2H_5).S.HC(C_2H_5).COOH$

Because of the fact that thiodiglycolic acid and the lower alkyl-substituted thiodiglycolic acids are very soluble in water, isolation of the pure material from the mixture of acid, inorganic salts, and water presents serious difficulties.

According to the prior art, the aqueous solution of thiodiglycolic acid resulting from acidification of the aqueous sodium thiodiglycolate is subjected to crystallization, whereupon only part of the thiodiglycolic acid separates from solution. A considerable portion remains dissolved in the mother liquors together with inorganic salts. Moreover, the portion of thiodiglycolic acid which crystallizes out is contaminated with inorganic salts and must be further purified to obtain a satisfactory product.

As a result of the difficulties which have surrounded the preparation of thiodiglycolic acid in the past, this acid has not been used industrially in spite of the fact that it can be made from inexpensive raw materials such as sodium sulfide, acetic acid, and chlorine.

Thiodiglycolic acid is a useful dibasic acid, which may replace other well-known dibasic acids, such as adipic, azelaic, sebacic, maleic, and phthalic acids, in certain applications. Certain esters obtained from thiodiglycolic acid and aliphatic and cycloaliphatic alcohols have been found useful as plasticizers for synthetic rubber and certain types of resins. Esters of the alkyl-substituted acids also may be useful as plasticizers.

It is an object of this invention to provide a simple, economical, and convenient method for recovering thiodiglycolic acid and water-soluble alkyl-substituted thiodiglycolic acids in substantially pure form from aqueous inorganic salt solutions obtained in the manufacture of these acids from alkali metal sulfides and alpha-halogenated fatty acid salts.

Other objects and advantages of this invention will become apparent from the following detailed description:

In accordance with this invention it has been found that the difficulties mentioned above can be overcome and that thiodiglycolic acid and water-soluble, alkyl-substituted thiodiglycolic acids can be recovered readily in good yield from aqueous inorganic salt-containing solutions in which they are produced by extracting said solutions with an aliphatic or cycloaliphatic alcohol which contains 3 to 6 carbon atoms. Such alcohols form water-azeotropes, they are not completely miscible with the aqueous solution of the acid and on subsequent distillation leave an aqueous solution from which the acid may be recovered. The solvent properties of such compounds are easily altered. For instance, the solubility of water in an alcohol and the solubility of the alcohol in water are greatly decreased by the addition of a small amount of benzene or carbon tetrachloride. The alcohols containing less than three carbon atoms are of themselves too soluble in aqueous inorganic salt solutions to be suitable for the extraction. Alcohols containing more than six carbon atoms do not dissolve enough of the acids to make them effective as extractants.

Extraction of the thiodiglycolic acid may be carried out batchwise or by a continuous counter-current process. The extraction may be carried out at elevated temperatures, if desired, in order to increase the solubility of the thiodiglycolic acid in the organic solvent, but with my preferred solvent, extraction at ordinary temperatures is entirely satisfactory.

Solvents which are suitable for the practice of this invention include isopropyl alcohol, n-butyl alcohol, n-amyl alcohol, isoamyl alcohol, mixed amyl alcohols, t-amyl alcohol, cyclohexanol, diethyl carbinol, sec.-butyl carbinol, n-hexanol, 2-ethylbutanol and methyl isobutyl carbinol.

Isopropyl alcohol is a preferred extractant for extracting thiodiglycolic acid and alkyl-substituted thiodiglycolic acids from the aqueous solutions in which they are prepared. It is an excellent solvent for thiodiglycolic acid, and its low boiling point simplifies solvent recovery. Moreover, it is readily available at low cost. The solvents listed above may be used in conjunction with other organic solvents for carrying out the extraction process of this invention. The use of another solvent in combination with an alcohol is particularly advantageous when operating the process with alcohols which are quite soluble in the aqueous inorganic-salt containing solutions. For example, when isopropyl alcohol is employed, the presence of benzene or carbon tetrachloride decreases the quantity of the alcohol dissolved by the aqueous phase and decreases the solubility of water in the organic solvent phase.

While this specification describes in detail the process of producing thiodiglycolic acid

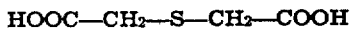

it will be obvious to one skilled in the art that the procedure may be applied also to the preparation of alkyl-substituted thiodiglycolic acids of the general formula:

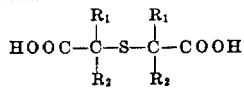

where $R_1$ and $R_2$ represent hydrogen atoms or alkyl groups in water-soluble, alkyl-substituted acids. Acids of the above type are formed in a well-known manner by reacting an alpha-chloro or alpha-bromo fatty acid salt with an inorganic sulfide, such as sodium or potassium sulfide, in aqueous solution, followed by acidification with a mineral acid, such as sulfuric or hydrochloric acid. Representative examples of alpha-chloro and alpha-bromo fatty acids are alpha-chloroacetic acid, alpha-chloropropionic acid, alpha-bromopropionic acid, alpha-chlorobutyric acid, and alpha-chloroisobutyric acid. Ordinarily, the sodium salt of the acid is used because most economical. Other salts might be employed.

In extracting thiodiglycolic acid from the crude aqueous solution containing inorganic salts, I prefer to use a continuous countercurrent process because of the simplicity of operation. For example, a suitable solvent is passed upward through an extraction tower, provided with suitable packing or other arrangement for obtaining intimate contact between the solvent and the aqueous solution, and the aqueous solution containing inorganic salts and thiodiglycolic acid is passed downward through the tower.

From the top of the extraction tower there is withdrawn a liquid stream consisting of a solution of thiodiglycolic acid in the organic solvent. The thiodiglycolic acid can be crystallized out in substantially pure form after distilling off part of the solvent. The solvent may be recovered and recycled to the extraction tower. Part of the water which is dissolved in the organic extract solution will be distilled azeotropically with the solvent; with certain solvents all of the water may be removed in this way.

From the bottom of the extraction tower there is withdrawn an aqueous solution of inorganic salts containing very little thiodiglycolic acid. Small quantities of organic solvent contained in this aqueous solution may be stripped off by distillation and recovered.

In order to avoid crystallization of inorganic salts in the extraction tower due to removal of water by the organic solvent, it is sometimes desirable to introduce a small amount of water along with the organic solvent.

The accompanying drawing shows diagrammatically one method of carrying out the process of this invention as applied to the manufacture of thiodiglycolic acid. An aqueous solution of sodium sulfide is introduced through lines 10 and 11 into a jacketed reactor 12, provided with an agitator 13. An aqueous solution of sodium chloroacetate, prepared by neutralizing chloroacetic acid with sodium carbonate or sodium hydroxide, is introduced through line 14. The mixture is heated until reaction is substantially complete, and then sulfuric acid is added through lines 15 and 11 in sufficient quantity to convert the sodium thiodiglycolate to thiodiglycolic acid.

The aqueous solution of thiodiglycolic acid and inorganic salts is withdrawn from reactor 12 through valved line 16 and passes through filter 17 to extraction tower 18 which may be provided with suitable packing to insure efficient contact between the aqueous phase and the isopropyl alcohol which is introduced near the bottom of tower 18 through line 19. The isopropyl alcohol ascends the tower and removes the thiodiglycolic acid from the descending aqueous layer.

From the top of extraction tower 18 there is withdrawn through valved line 20 a solution of thiodiglycolic acid in isopropyl alcohol. This solution passes to evaporator 21 where most of the solvent, together with the small amount of water that may be present, is distilled off. This evaporator may be operated under vacuum if desired. The vapors leaving the evaporator through lines 22 and 23 are passed to condenser 24, and the condensate is conveyed to the isopropyl alcohol storage tank 25, from which it may be withdrawn and returned to the extraction tower through line 19. Isopropyl alcohol required for make-up may be added through line 26.

A concentrated solution of thiodiglycolic acid in isopropyl alcohol is withdrawn from evaporator 21 through line 27 and conducted to crystallizer 28. The mother liquor from the crystallizer is returned to evaporator 21 through line 29. The crystalline thiodiglycolic acid from crystallizer 28 is conveyed to drier 30 and thence to storage. Residual solvent which is removed from the crystals in the drier is conveyed through line 23, thence to condenser 24 and storage tank 25.

The aqueous salt solution from which the thiodiglycolic acid has been extracted leaves extraction tower 18 through line 31 and is conducted to a stripping column 32 for recovery of the isopropyl alcohol which it contains. Steam is introduced through line 33 and the azeotrope of isopropyl alcohol leaving the stripping column through line 34 passes through condenser 35 to storage tank 25. Waste solution of inorganic salts is discarded from the system through line 36.

It is obvious that other methods may be used for recovering crystalline thiodiglycolic acid from solution in the isopropyl alcohol or other extractant. For example, an evaporator drier consisting of enclosed steam heated rolls may be employed;

or the steps of evaporation, crystallization, and drying may be carried out in other conventional types of equipment.

A modification of the above process, not shown in the diagram, is to remove the isopropyl alcohol or other solvent from the extract by treating with water (as steam, if preferred) in excess of the quantity required to form the isopropyl alcohol-water azeotrope, and fractionally distilling off the latter so as to leave a concentrated aqueous solution of thiodiglycolic acid. The thiodiglycolic acid can then be crystallized from this aqueous solution. The azeotrope referred to above may be condensed and reused for further extractions. One advantage of this modified method of recovering the thiodiglycolic acid is that it eliminates losses of isopropyl alcohol which may be associated with the crystallization and drying steps.

The process is further illustrated by the following:

Example

Four kilograms of alpha-chloracetic acid were dissolved in 9 kilograms of water and neutralized by the addition of sodium carbonate. In a separate vessel 2.7 kilograms of 60 per cent sodium sulfide were dissolved in 7 kilograms of water. The sodium chloroacetate solution and the sodium sulfide solution were pumped simultaneously into a five-gallon, glass-lined, jacketed kettle over a period of about twenty minutes with agitation. During the mixing, cold water was circulated through the jacket to prevent the temperature of the mixture from rising above 50–60° C. Subsequently, the mixture was brought to a boil and refluxed for approximately two hours to complete the reaction. The reaction mixture was cooled to 30° C., and 2.2 kilograms of concentrated sulfuric acid were added over a period of about ten minutes. During the entire process described above, the mixture was mechanically agitated.

In order to recover the thiodiglycolic acid, the acidified reaction mixture was extracted with isopropyl alcohol in the following manner: Three kilograms of isopropyl alcohol were added to the kettle, and the mixture was agitated for five minutes and allowed to separate into two layers. The upper layer was withdrawn, and the procedure was repeated four times with fresh isopropyl alcohol.

The combined extracts were concentrated by distillation of the isopropyl alcohol and some of the extracted water to a volume of 5 liters, leaving an aqueous solution of thiodiglycolic acid. The concentrated aqueous solution, on cooling, deposited approximately 1 kilogram of crystalline thiodiglycolic acid. Additional thiodiglycolic acid to the extent of 1600 grams was recovered by working up the mother liquors. The total overall yield of thiodiglycolic acid was 83 per cent of the theoretical, and the efficiency of its extraction from the reaction mixture was 98 per cent. The product contained 10 to 15 per cent of inorganic salts.

The same procedure may be followed with other aliphatic and cycloaliphatic alcohols containing 3 to 6 carbon atoms.

This application is a continuation-in-part of my copending application Serial No. 594,582, filed May 18, 1945.

What I claim is:

1. The method of obtaining an acid of the class consisting of thiodiglycolic acid and water-soluble, alkyl-substituted thiodiglycolic acids from the aqueous inorganic salt solution in which it is produced by reacting an alkali metal sulfide with an alpha-halogenated fatty acid salt in water solution and then acidifying with a mineral acid, which comprises extracting the acid from the aqueous solution with a solvent composed essentially of an alcohol from the class consisting of alcohols containing three to six carbon atoms.

2. The method of obtaining an acid of the class consisting of thiodiglycolic acid and water-soluble, alkyl-substituted thiodiglycolic acids from the aqueous inorganic salt solution in which it is produced by reacting an alkali metal sulfide with an alpha-halogenated fatty acid salt in water solution and then acidifying with a mineral acid, which comprisecs extracting the acid from the aqueous solution with an alcohol from the class consisting of the alcohols, which contain three to six carbon atoms, adding water to the extract in excess of that required to form the alcohol-water azeotrope, and distilling off the latter to leave an aqueous solution of the acid.

3. The method of obtaining thiodiglycolic acid from the aqueous inorganic salt solution in which it is produced by reacting an alkali metal sulfide with an alpha-halogenated acetic acid salt and then acidifying with a mineral acid, which comprises extracting the thiodiglycolic acid from the aqueous solution with isopropyl alcohol.

4. The method of obtaining thiodiglycolic acid from the aqueous inorganic salt solution in which it is produced by reacting an alkali metal sulfide with an alpha-halogenated acetic acid salt and then acidifying with a mineral acid, which comprises extracting the thiodiglycolic acid from the aqueous solution with an alcohol of the class consisting of the alcohols which contain three to six carbon atoms.

5. The method of obtaining thiodiglycolic acid from the aqueous inorganic salt solution in which it is produced by reacting an alkali metal sulfide with an alpha-halogenated acetic acid salt and then acidifying with a mineral acid, which comprises extracting the thiodiglycolic acid from the aqueous solution with isopropyl alcohol, adding water to the extract in excess of that required to form the alcohol-water azeotrope and distilling off the latter to leave an aqueous solution of the acid.

6. The continuous process of producing an acid of the class consisting of thiodiglycolic acid and the lower alkyl-substituted thiodiglycolic acids which are relatively soluble in water, which comprises reacting an alkali metal sulfide with an alpha-halogenated fatty acid in water solution and then acidifying with a mineral acid to obtain the acid of the aforesaid class, extracting the acid by bringing a substantially constantly flowing stream of it into large-surface contact with a substantially constant countercurrently flowing stream of an extractant which is composed essentially of a solvent of the class consisting of alcohols which contain three to six carbon atoms, separating the immiscible extractant by gravity and recovering the acid therefrom, all as steps of a substantially continuous process.

7. The continuous process of producing thiodiglycolic acid which comprises reacting an alkali metal sulfide with an alpha-halogenated acetic acid in water solution and then acidifying with a mineral acid to obtain the thiodiglycolic acid, extracting the acid by bringing the water solution and an extractant composed essentially of isopropyl alcohol into intimate, large-surface contact while causing the aqueous solution and extractant to flow countercurrent to one another, separating the extractant and aqueous solution by gravity, adding water to the resultant acid-containing extractant to make its water content in excess of that required to form a water azeotrope with the alcohol, distilling from the solution the water azeotrope of the alcohol, and thus obtaining as a residue a water solution of the acid.

ARTHUR E. BEARSE.

REFERENCES CITED

The following references are of record in the file of this patent:

UNITED STATES PATENTS

| Number | Name | Date |
|---|---|---|
| 1,862,594 | Herz et al. | June 14, 1932 |
| 1,988,501 | Lubs et al. | Jan. 22, 1935 |
| 1,762,719 | Hoffa et al. | June 10, 1930 |
| 2,262,686 | Kyrides et al. | Nov. 11, 1941 |
| 1,987,526 | Elbel et al. | Jan. 8, 1935 |

FOREIGN PATENTS

| Number | Country | Date |
|---|---|---|
| 845,793 | France | Sept. 1, 1939 |

OTHER REFERENCES

Seka, Ber. Deut. Chem., vol. 58, p. 1786 (1925).
Schulze, Loven, etc., Beilstein (Handbuch der Org. Chem.), (4th ed.), vol. III, p. 253 (1921).

Certificate of Correction

Patent No. 2,425,226. August 5, 1947.

ARTHUR E. BEARSE

It is hereby certified that errors appear in the printed specification of the above numbered patent requiring correction as follows: Column 6, line 17, claim 2, for "comprisees" read *comprises*; line 19, same claim, after the word "alcohols" strike out the comma; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.* contact while causing the aqueous solution and extractant to flow countercurrent to one another, separating the extractant and aqueous solution by gravity, adding water to the resultant acid-containing extractant to make its water content in excess of that required to form a water azeotrope with the alcohol, distilling from the solution the water azeotrope of the alcohol, and thus obtaining as a residue a water solution of the acid.

ARTHUR E. BEARSE.

REFERENCES CITED

The following references are of record in the file of this patent:

UNITED STATES PATENTS

| Number | Name | Date |
|---|---|---|
| 1,862,594 | Herz et al. | June 14, 1932 |
| 1,988,501 | Lubs et al. | Jan. 22, 1935 |
| 1,762,719 | Hoffa et al. | June 10, 1930 |
| 2,262,686 | Kyrides et al. | Nov. 11, 1941 |
| 1,987,526 | Elbel et al. | Jan. 8, 1935 |

FOREIGN PATENTS

| Number | Country | Date |
|---|---|---|
| 845,793 | France | Sept. 1, 1939 |

OTHER REFERENCES

Seka, Ber. Deut. Chem., vol. 58, p. 1786 (1925).
Schulze, Loven, etc., Beilstein (Handbuch der Org. Chem.), (4th ed.), vol. III, p. 253 (1921).

Certificate of Correction

Patent No. 2,425,226.    August 5, 1947.

ARTHUR E. BEARSE

It is hereby certified that errors appear in the printed specification of the above numbered patent requiring correction as follows: Column 6, line 17, claim 2, for "comprisees" read *comprises*; line 19, same claim, after the word "alcohols" strike out the comma; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*